US010253225B2

(12) United States Patent
van Gorkom et al.

(10) Patent No.: US 10,253,225 B2
(45) Date of Patent: Apr. 9, 2019

(54) APCHA AS A BUILDING BLOCK IN CURING AGENT FORMULATIONS FOR STRUCTURAL ADHESIVES

(71) Applicant: EVONIK DEGUSSA GMBH, Essen (DE)

(72) Inventors: Marieke Theodora Arnolda van Gorkom, De Moer (NL); Edze Jan Tijsma, Zeist (NL)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 15/841,503

(22) Filed: Dec. 14, 2017

(65) Prior Publication Data
US 2018/0179423 A1  Jun. 28, 2018

Related U.S. Application Data

(60) Provisional application No. 62/438,687, filed on Dec. 23, 2016.

(51) Int. Cl.
| | |
|---|---|
| *C09J 163/00* | (2006.01) |
| *C08G 59/46* | (2006.01) |
| *C08G 59/50* | (2006.01) |
| *C08G 59/24* | (2006.01) |
| *C08G 59/40* | (2006.01) |
| *C08G 59/60* | (2006.01) |
| *C09J 5/04* | (2006.01) |
| *F03D 1/06* | (2006.01) |

(52) U.S. Cl.
CPC ........ *C09J 163/00* (2013.01); *C08G 59/245* (2013.01); *C08G 59/4007* (2013.01); *C08G 59/4085* (2013.01); *C08G 59/46* (2013.01); *C08G 59/504* (2013.01); *C08G 59/5026* (2013.01); *C08G 59/60* (2013.01); *C09J 5/04* (2013.01); *F03D 1/0675* (2013.01); *F05B 2230/20* (2013.01); *F05B 2240/21* (2013.01); *F05B 2240/30* (2013.01); *F05B 2280/6015* (2013.01)

(58) Field of Classification Search
CPC .................................................. C09J 163/00
See application file for complete search history.

(56) References Cited

U.S. PATENT DOCUMENTS

| | | | | |
|---|---|---|---|---|
| 3,096,349 A * | 7/1963 | Meyer et al. | ........ | C07D 303/24 528/418 |
| 3,449,353 A * | 6/1969 | Porret | ........ | C08G 59/10 156/330 |
| 4,294,792 A * | 10/1981 | Arons | ........ | B29C 33/405 264/310 |
| 6,288,208 B1 | 9/2001 | Moshinsky | | |
| 6,329,473 B1 * | 12/2001 | Marten | ........ | C08G 59/10 525/438 |
| 7,683,154 B2 * | 3/2010 | Volle | ........ | C08G 59/184 252/182.13 |
| 2008/0139728 A1 * | 6/2008 | Klopsch | ........ | C08G 59/1405 524/442 |
| 2009/0227718 A1 * | 9/2009 | Tanimoto | ........ | C08F 261/04 524/321 |
| 2010/0048827 A1 * | 2/2010 | Walker | ........ | C07C 211/27 525/403 |
| 2010/0285311 A1 * | 11/2010 | Steidl | ........ | C08G 18/2845 428/339 |
| 2011/0190420 A1 * | 8/2011 | Nagelsdiek | ........ | C04B 26/14 523/428 |
| 2011/0218270 A1 * | 9/2011 | Suter | ........ | C08G 69/34 523/400 |
| 2014/0243557 A1 * | 8/2014 | Altenhoff | ........ | C08G 73/0206 564/512 |
| 2014/0275446 A1 * | 9/2014 | Kramer | ........ | C08G 59/182 525/523 |
| 2014/0288247 A1 * | 9/2014 | Burckhardt | ........ | C08G 59/184 525/523 |
| 2014/0309334 A1 * | 10/2014 | Kramer | ........ | C08G 59/50 523/400 |
| 2015/0093582 A1 * | 4/2015 | Buening | ........ | C08J 7/047 428/413 |
| 2015/0337076 A1 * | 11/2015 | Kasemi | ........ | C08G 59/184 528/103 |
| 2015/0368466 A1 * | 12/2015 | Kelch | ........ | C08G 59/245 523/402 |

(Continued)

FOREIGN PATENT DOCUMENTS

| | | |
|---|---|---|
| DE | 130580 A2 | 4/1978 |
| EP | 3002314 A1 | 4/2016 |

(Continued)

OTHER PUBLICATIONS

European Search Report dated Apr. 16, 2018 corresponding to EP Application No. 17207219.1 filed Dec. 14, 2017 (12 pages).

*Primary Examiner* — Megan McCulley

(74) *Attorney, Agent, or Firm* — Andrew H. Chung; Linda S. Li; Jason S. Ngui

(57) ABSTRACT

The invention relates to structural adhesive compositions and more particularly to two-component (2K) structural adhesive compositions. The two components chemically react to bond structural surfaces. N-(3-Aminopropyl)cyclohexylamine (APCHA) has been found to be an improved curing agent for use with epoxy resins in 2K adhesive compositions. APHCA exhibits favorable features including viscosity, pot life and reactivity, and adhesive and thermal performance after curing with epoxy resin. These features and its unique chemistry allow the use of APCHA in curing agent formulations for structural adhesives, in particular wind turbine blade adhesives. APCHA solves issues with viscosity build-up, working time, through-cure, compatibility and adhesive performance that cannot be addressed with the commonly used amine formulations.

17 Claims, 4 Drawing Sheets

(56) References Cited

U.S. PATENT DOCUMENTS

| | | | | |
|---|---|---|---|---|
| 2016/0326300 A1* | 11/2016 | Gelves | ............... | C09K 8/80 |
| 2017/0137562 A1* | 5/2017 | Zheng | ............... | C07D 233/02 |
| 2017/0166687 A1* | 6/2017 | Ortelt | ............... | C08G 59/3227 |
| 2017/0253779 A1* | 9/2017 | Schlechte | ............... | B32B 7/12 |
| 2017/0355810 A1* | 12/2017 | Langkabel | ............... | C08G 59/245 |
| 2018/0162991 A1* | 6/2018 | Ortelt | ............... | C08J 5/04 |

FOREIGN PATENT DOCUMENTS

| | | |
|---|---|---|
| EP | 3170849 A1 | 5/2017 |
| EP | 3178861 A1 | 6/2017 |
| EP | 3178863 A1 | 6/2017 |

\* cited by examiner

FIG. 1 – PRIOR ART

| Composition UMX-126 | A Ref | B | C | D | E | F | G | H |
|---|---|---|---|---|---|---|---|---|
| A3030 | 40 | 40 | 40 | 40 | 40 | 40 | 40 | 40 |
| PACM | 25 | - | 25 | 15 | - | 15 | 15 | 15 |
| D-400 | 20 | 45 | - | 20 | 20 | 35 | 20 | 25 |
| APCHA | - | 15 | 20 | 10 | 25 | 10 | 25 | 20 |
| DA-17 | 15 | 37 | 15 | 15 | 15 | - | - | - |
| Use level (phr) | 46 | 37 | 37 | 43 | 43 | 44.5 | 39 | 41 |
| Property | | | | | | | | |
| Gel time 150 g @ 25 °C (min) | 165 | 108 | 107 | 169 | 150 | 207 | 130 | 147 |
| Time to 10 Pa.s @ 70 °C (min) | 22 | 19 | 18 | 22 | 22 | 24 | 19 | 21 |
| Time to gel point @ 70 °C (min) | 71 | 76 | 80 | 107 | 73 | 82 | 67 | 78 |
| Tg - DSC return (°C) | 87 | 78 | 96 | 62/81 | 55/71 | 83 | 84 | 87 |
| Time to 80 °C (hr) | 8h | | | 8h | | | 8h | |
| Tg @ 70 °C cure (°C) | 82 | | | 76 | | | 80 | |

FIG. 2

| Component | Range | Preferred range | UMX-126D |
|---|---|---|---|
| APCHA | 5-50 | 5-15 | 10 |
| Polyamide (e.g. A3030) | 10-60 | 30-50 | 40 |
| Cycloaliphatic amine (PACM) | 10-40 | 10-20 | 15 |
| Polyether diamine (Jeffamine D-400) | 10-50 | 10-30 | 20 |
| Ether diamine (Tomamine DA-17) | 0-30 | 10-20 | 15 |
| *Total* | | | 100 |

FIG. 4

APCHA AS A BUILDING BLOCK IN CURING AGENT FORMULATIONS FOR STRUCTURAL ADHESIVES

BACKGROUND OF THE INVENTION

Recently, wind turbines have received increased attention as environmentally safe and relatively inexpensive alternative energy sources. Considerable efforts are being made to develop wind turbines that are reliable and efficient. Generally, a wind turbine includes a rotor with multiple wind turbine blades. The wind turbine blades are shaped as elongated airfoils configured to provide rotational forces in response to wind. One current approach to manufacturing wind turbine blades is to produce each blade either as two half shells and a spar, or as two half shells with an integral spar. In both cases, the two half shells are bonded together along their edges with an adhesive material to form the complete blade. Typically, the adhesive material is a two-component (2K) structural adhesive material that includes two components that chemically react (i.e., crosslink) when mixed under ambient conditions to bond together the half shells.

The adhesives that are utilized to couple the wind turbine blade halves must be able to withstand the centrifugal forces applied to each blade during use and maintain bond strength for the blade's lifetime under constant thermal cycling and environmental attack. In addition, these adhesive materials should be relatively easy to apply. Thus, for 2K adhesives, pot life is an important consideration. The term "pot life", as those of ordinary skill in the adhesives arts recognizes, may be defined as the time period in which the adhesive composition is sufficiently liquid such that it may be applied to a substrate material to be bonded. An adhesive material with a shorter pot life is wherein the two components react more quickly, and an adhesive material with longer pot life is wherein the two components react more slowly.

Another aspect to consider, in particular as demand grows for longer blades, is open time. The term "open time" may be defined as the time period between the application of the adhesive on one half shell and the placement of the second half shell on the adhesive bond line. An adhesive material providing good adhesive properties even after a long open time is preferred. Another aspect to consider is the environmental conditions, temperature and humidity, under which the half shells are bonded together. Ideally, an adhesive material is robust over a wide range of conditions, and not sensitive to adverse environmental conditions.

Wind turbine blade manufacturers are being challenged because of demands for larger blades. In the past, the largest operating wind turbines had rotor diameters of less than 100 meters. The rotor diameter is approximately twice the blade length, so the largest blades on these rotors were less than 50 meters. Presently, some onshore wind turbine rotor diameters are as large as 130 meters and some offshore turbines have rotor diameters of 170 meters. However, as the blades become longer, the currently available adhesives cause processing problems.

The use of epoxy-based adhesives to bond wind turbine blade shells is well-known. Typical related art can be found, for example, in DE102011113395 and US2012128499. Prior art adhesives do not have sufficiently long pot life, are sensitive to long open times and/or do not have the right reactivity at elevated temperatures to meet the demands casued by the increasing blade sizes.

FIG. 1 shows tensile data generated using a standard wind blade adhesive reference epoxy curing agent with a diglycidyl ether of bisphenol A (DGEBA)-type liquid epoxy resin, having an epoxy equivalent weight (EEW) of 190. Under normal conditions (no open time), the force required to pull two substrates was 8 MPa at an elongation of about 1%. Using the same curing agent and substrates, but with an open time of 1 hour at 23° C. and a relative humidity of 70%, the force required to pull the substrates dropped to 2 MPa (75% decrease) at an elongation of only 0.3%.

Due to the deficiencies discussed above, blade manufacturers have been faced with blade failures, such that the adhesive between the two shells fails. Thus, there is a need in the art for adhesive compositions that have a long pot life, good bonding capability after a long open time, and effective under varied environmental conditions.

SUMMARY OF THE INVENTION

The present invention is directed toward adhesive compositions that provide sufficient bond strength, are easy to apply, not sensitive when used under long open time conditions, and have sufficiently long pot live for use in bonding together substrate materials such as wind turbine blades.

In an aspect of the invention the adhesive composition comprises an epoxy resin component that is cured with a curing agent component comprising N-(3-aminopropyl)cyclohexylamine (APCHA).

BRIEF DESCRIPTION OF THE DRAWINGS

The present invention will hereinafter be described in conjunction with the appended figures wherein like numerals denote like elements:

FIG. 2 is a table summarizing the composition and properties of formulations of the present invention.

FIG. 4 is a table listing the composition of amine formulations used in preferred embodiments of the curing agents of the present invention.

DETAILED DESCRIPTION OF THE INVENTION

Figure 1:
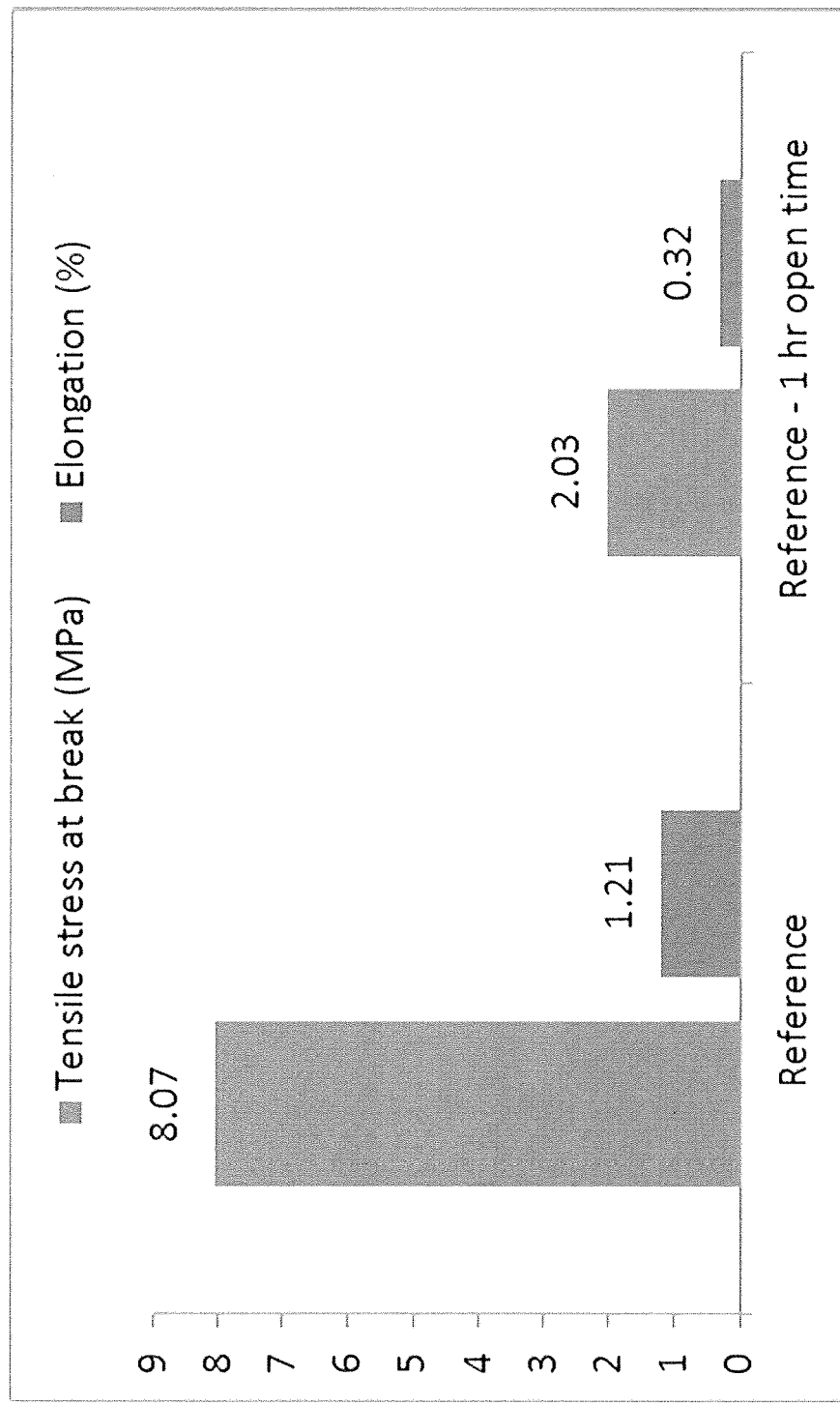
FIG. 1 is a graph showing the tensile strength of wind blades manufactured using adhesive compositions cured with an exemplary prior art curing agent.

The ensuing detailed description provides preferred exemplary embodiments only, and is not intended to limit the scope, applicability, or configuration of the invention. Rather, the ensuing detailed description of the preferred exemplary embodiments will provide those skilled in the art with an enabling description for implementing the preferred exemplary embodiments of the invention. Various changes may be made in the function and arrangement of elements without departing from the spirit and scope of the invention, as set forth in the appended claims.

In the claims, letters may be used to identify claimed method steps (e.g. a, b, and c). These letters are used to aid in referring to the method steps and are not intended to indicate the order in which claimed steps are performed, unless and only to the extent that such order is specifically recited in the claims.

The present invention relates to structural adhesive compositions and more particularly to 2K structural adhesive compositions. The present invention also relates to 2K structural adhesive compositions comprising an epoxy resin component and an amine-based curing agent composition. An aspect of the present invention relates to amine-based curing agents comprising an amine formulation containing APCHA.

APCHA is an amine curing agent having specific desireable features, such as viscosity and reactivity, and good adhesive and thermal performance after curing with epoxy resin. These features and its unique chemistry allow the use of APCHA in curing agent formulations for structural adhesives, in particular wind blade adhesives. APCHA solves issues with viscosity build-up, working time, through-cure, compatibility and adhesive performance that cannot be addressed with the commonly used amine formulations.

The issue of loss of performance, described above, is addressed by modifying the composition of the epoxy system, in particular the composition of the curing agent formulation. The typical composition of a wind blade curing agent is such that compatibility issues may occur. APCHA, due its chemical structure, does not give rise to these issues. Surprisingly, curing agent formulations can be designed using APCHA, which provide not only good adhesive performance, but also have good general performance as a structural adhesive curing agent formulation.

As is known in the art, an epoxy system comprises an epoxy resin component and a curing agent component. Any suitable formulation can be used for the epoxy resin component. DGEBA-type liquid epoxy resins have been found to be particularly suitable. One example of a suitable epoxy resin component consists of 64% DGEBA-type liquid epoxy resin (EEW 190), 34.5% talc, and 1.5% fumed silica. The ratio of epoxy resin component to curing agent component is preferably in the range from 100/65 to 100/85 by weight and, more preferably, the range from 100/70 to 100/80 by weight. A ratio of 100/76 by weight has been found to work particularly well with formulation UMX-126D of FIG. 2.

In one exemplary embodiment, the amine formulation of the curing agent component comprises APCHA, at least one polyamide, at least one cycloaliphatic amine, at least one polyether diamine, and at least one ether diamine. Acceptable ranges (expressed as % by weight) for each of these components are shown in the "Range" column of FIG. 4. Preferred ranges (expressed as % by weight) are shown in the "Preferred Range" column of FIG. 4. Reactive liquid polymers containing amine functionality, for example amine terminated butadiene-acrylonitrile copolymers such as Hycar ATBNX16, may optionally be present in the curing agent component. However, such co-polymers are not part of the amine formulation as defined by this disclosure.

Suitable polyamides of the present disclosure include, but are not limited to, Ancamide® 3030 (A3030). Suitable cycloaliphatic amines of the present disclosure include, but are not limited to, 4,4'-methylenebiscyclohexanamine (PACM). Suitable polyether diamines of the present disclosure include, but are not limited to, alpha-(2-aminomethylethyl)omega-(2-aminomethylethoxy) (Jeffamine® 230, Jeffamine® D-400). Suitable ether diamines of the present disclosure include, but are not limited to, isotridecyloxypropyl-1,3-diaminopropane (Tomamine DA-17). Ancamide® is a registered trademark of Evonik Corp. Jeffamine® is a registered trademark of Huntsman Petrochemical LLC.

An exemplary curing agent component comprises Formulation UMX-126D (see FIG. 4). This curing agent component consists of: Formulation UMX-126D (36 wt. %); Hycar ATBNX16 (11%); aluminum (15.5%); talc (36%); fumed silica (1.5%).

Figure 3:
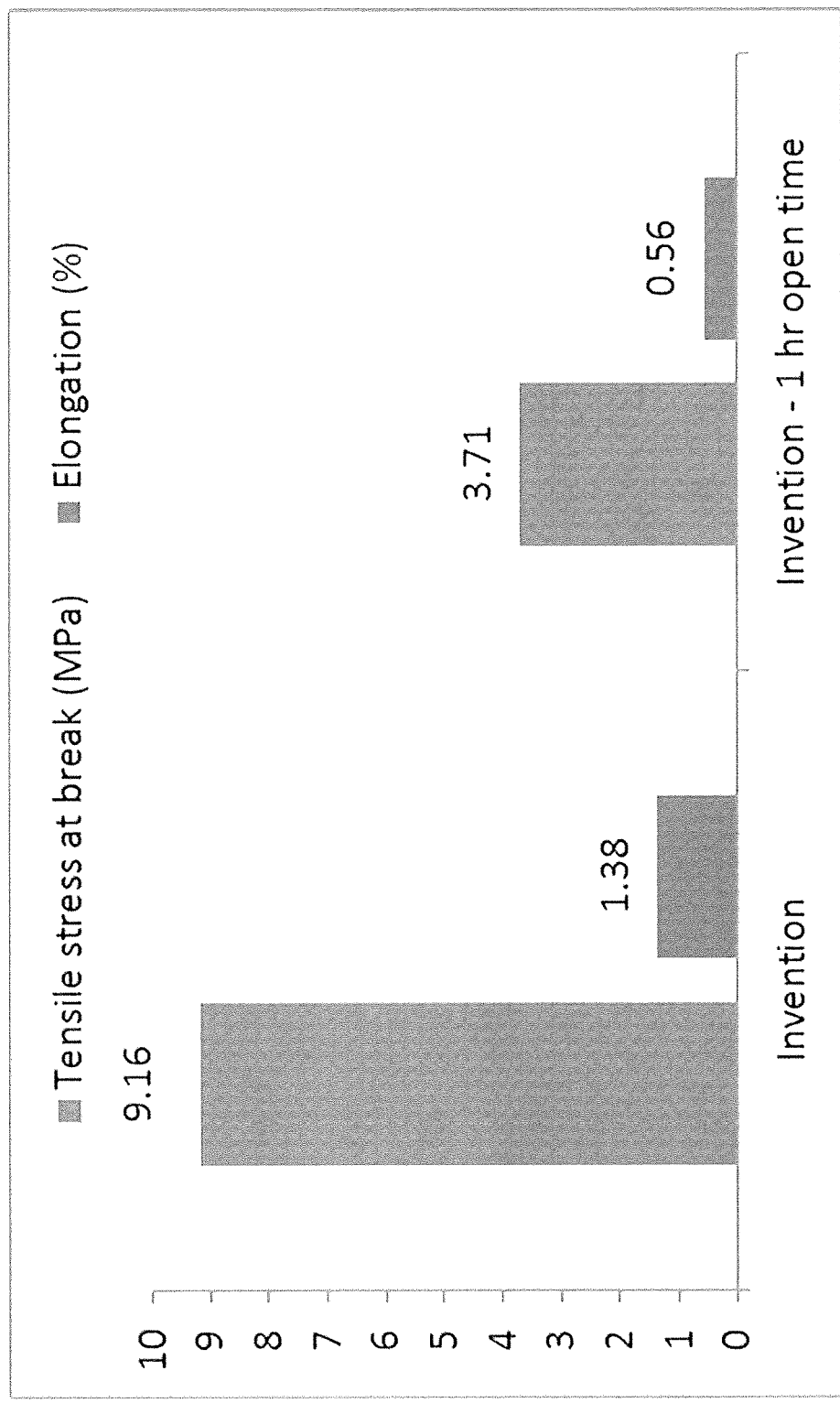
FIG. 3 is a graph showing the tensile strength of wind blades manufactured using adhesive compositions cured with curing agent formulation UMX-126D.

Experimental data demonstrates that the use of APCHA in a curing agent formulation indeed addressed the issue of loss of performance after long open time under adverse conditions. FIG. 3 shows tensile data generated using formulation UMX-126D of FIG. 2. The graph shows that at least one formulation based on the current invention, UMX-126D, showed a significant improvement in adhesive performance. In particular, after being exposed for 1 hr (open time), the absolute values were found to be higher, and also the drop in performance was significantly less (60%), as compared to a 75% drop in performance in the prior art formulation shown in FIG. 1.

Epoxy Resin Component

The epoxy resin component can consist of a single resin, or it can be a mixture of mutually compatible epoxy resins. The epoxy resin may include, but is not limited to, bi-functional epoxies, such as, bisphenol-A and bisphenol-F resins. Multifunctional epoxy resin, as utilized herein, describes compounds containing two or more 1,2-epoxy groups per molecule. Epoxide compounds of this type are well known to those of skill in the art and are described in Y. Tanaka, "Synthesis and Characteristics of Epoxides", in C. A. May, ed., *Epoxy Resins Chemistry and Technology* (Marcel Dekker, 1988), which is incorporated herein by reference in its entirety.

One class of epoxy resins suitable for use in the epoxy resin component comprises the glycidyl ethers of polyhydric phenols, including the glycidyl ethers of dihydric phenols. Illustrative examples include, but are not limited to, the glycidyl ethers of: resorcinol, hydroquinone, bis-(4-hydroxy-3,5-difluorophenyl)-methane, 1,1-bis-(4-hydroxyphenyl)-ethane, 2,2-bis-(4-hydroxy-3-methylphenyl)-propane, 2,2-bis-(4-hydroxy-3,5-dichlorophenyl) propane, 2,2-bis-(4-hydroxyphenyl)-propane (commercially known as bisphenol A), bis-(4-hydroxyphenyl)-methane (commercially known as bisphenol-F, and which may contain varying amounts of 2-hydroxyphenyl isomers), and the like, or any combination thereof. Additionally, advanced dihydric phenols of the structure of formula (1) also are useful in the present disclosure:

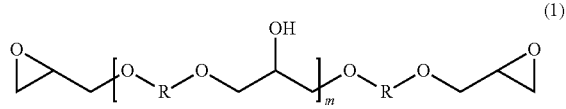

(1)

where m is 0 to 25, and R is a divalent hydrocarbon radical of a dihydric phenol, such as those dihydric phenols listed above.

Materials according to formula (1) can be prepared by polymerizing mixtures of a dihydric phenol and epichlorohydrin, or by advancing a mixture of a diglycidyl ether of the dihydric phenol and the dihydric phenol. While in any given molecule the value of m is an integer, the materials are invariably mixtures which can be characterized by an average value of m which is not necessarily a whole number. Polymeric materials with an average value of m between 0 and about 7 can be used in one aspect of the present disclosure. In other embodiments, the epoxy component may be a polyglycidyl amine from one or more of 2,2'-methylene dianiline, 4,4'-methylene dianiline, m-xylene dianiline, hydantoin, and isocyanate.

The epoxy resin component may be a cycloaliphatic (alicyclic) epoxide. Examples of suitable cycloaliphatic epoxides include diepoxides of cycloaliphatic esters of dicarboxylic acids such as bis(3,4-epoxycyclohexylmethyl) oxalate, bis(3,4-epoxycyclohexylmethyl)adipate, bis(3,4- epoxy-6-methylcyclohexylmethyl)adipate, vinylcyclohexene diepoxides; limonene diepoxide; bis(3,4-epoxycyclohexylmethyl)pimelate; dicyclopentadiene diepoxide; and other suitable cycloaliphatic epoxies. Other suitable diepoxides of cycloaliphatic esters of dicarboxylic acids are described, for example, in Patent Application Publication No. WO 2009/089145 A1, which is hereby incorporated by reference in its entirety.

Other cycloaliphatic epoxides include 3,3-epoxycyclohexylmethyl-3,4-epoxycyclohexane carboxylate such as 3,4-epoxycyclohexylmethyl-3,4-epoxycyclohexane carboxylate; 3,3-epoxy-1-methylcyclohexyl-methyl-3,4-epoxy-1-methylcyclohexane carboxylate; 6-methyl-3,4-epoxycyclohexylmethylmethyl-6-methyl-3,4-epoxycyclohexane carboxylate; 3,4-epoxy-2-methylcyclohexyl-methyl-3,4-epoxy-3-methylcyclohexane carboxylate. Other suitable 3,4-epoxycyclohexylmentyl-3,4-epoxycyclohexane carboxylates are described, for example, in U.S. Pat. No. 2,890,194, which is hereby incorporated by reference in its entirety. In other embodiments, the epoxy component may include polyol polyglycidyl ether from polyethylene glycol, polypropylene glycol or polytetrahydrofuran or combinations thereof.

In another aspect, epoxy novolac resins, which are the glycidyl ethers of novolac resins, can be used as multifunctional epoxy resins in accordance with the present disclosure. In yet another aspect, the at least one multifunctional epoxy resin is a diglycidyl ether of bisphenol-A (DGEBA), an advanced or higher molecular weight version of DGEBA, a diglycidyl ether of bisphenol-F, an epoxy novolac resin, or any combination thereof. Higher molecular weight versions or derivatives of DGEBA are prepared by the advancement process, where excess DGEBA is reacted with bisphenol-A to yield epoxy terminated products. The epoxy equivalent weights (EEW) for such products range from about 450 to 3000 or more. Because these products are solid at room temperature, they are often referred to as solid epoxy resins.

DGEBA or advanced DGEBA resins are often used for structural formulations due to a combination of their low cost and generally high performance properties. Commercial grades of DGEBA having an EEW ranging from about 174 to about 250, and more commonly from about 185 to about 195, are readily available. At these low molecular weights, the epoxy resins are liquids and are often referred to as liquid epoxy resins. It is understood by those skilled in the art that most grades of liquid epoxy resin are slightly polymeric, since pure DGEBA has an EEW of 174. Resins with EEW's between 250 and 450, also generally prepared by the advancement process, are referred to as semi-solid epoxy resins because they are a mixture of solid and liquid at room temperature. Generally, multifunctional resins with EEW's based on solids of about 160 to about 750 are useful in the present disclosure. In another aspect, the multifunctional epoxy resin has an EEW in a range from about 170 to about 250.

Aspects of the present invention are, for example, as follows

<1> An adhesive composition comprising the reaction product of an epoxy resin component comprising at least one epoxy resin and a curing agent component comprising an amine formulation, wherein the amine formulation comprises a first amine component consisting of N-(3-aminopropyl)cyclohexylamine, and a second amine component consisting of at least one selected from the group of polyamides, cycloaliphatic amines, polyether diamines, and ether diamines.

<2> The adhesive composition according to <1>, wherein the first amine component is 5% to 50% by weight of the amine formulation.

<3> The adhesive composition according to <1>, wherein the first amine component is 5% to 15% by weight of the amine formulation.

<4> The adhesive composition according to any of <2> to <3>, wherein the amine formulation comprises at least one polyamide.

<5> The adhesive composition according to <4>, wherein the at least one polyamide is 10% to 60% by weight of the amine formulation.

<6> The adhesive composition according to <4>, wherein the at least one polyamide is 30% to 50% by weight of the amine formulation.

<7> The adhesive composition according to any of <2> to <3>, wherein the amine formulation comprises at least one cycloaliphatic amine.

<8> The adhesive composition according to <7>, wherein the at least one cycloaliphatic amine is 10% to 40% by weight of the amine formulation.

<9> The adhesive composition according to <7>, wherein the at least one cycloaliphatic amine is 10% to 20% by weight of the amine formulation.

<10> The adhesive composition according to any of <2> to <3>, wherein the amine formulation comprises at least one polyether diamine.

<11> The adhesive composition according to <10>, wherein the at least one polyether diamine is 10% to 50% by weight of the amine formulation.

<12> The adhesive composition according to <10>, wherein the at least one polyether diamine is 10% to 30% by weight of the amine formulation.

<13> The adhesive composition according to any of <2> to <3>, wherein the amine formulation comprises at least one ether diamine.

<14> The adhesive composition according to <13>, wherein the at least one ether diamine is up to 30% by weight of the amine formulation.

<15> The adhesive composition according to <13>, wherein the at least one ether diamine is 10% to 20% by weight of the amine formulation.

<16> The adhesive composition according to <1>, wherein the first amine component is 10% by weight of the amine formulation.

<17> The adhesive composition according to <16>, wherein the amine formulation comprises at least one polyamide, wherein the at least one polyamide is 40% by weight of the amine formulation.

<18> The adhesive composition according to <17>, wherein the amine formulation further comprises at least one cycloaliphatic amine, wherein the at least one cycloaliphatic amine is 15% by weight of the amine formulation.

<19> The adhesive composition according to <18>, wherein the amine formulation further comprises at least one polyether diamine, wherein the at least one polyether diamine is 20% by weight of the amine formulation.

<20> The adhesive composition according to <19>, wherein the amine formulation further comprises at least one ether diamine, wherein the at least one ether diamine is 15% by weight of the amine formulation.

<21> The adhesive composition according to any of <1> to <20>, wherein the at least one epoxy resin comprises bisphenol A diglycidyl ether.

<22> The adhesive composition according to <21>, wherein the bisphenol A diglycidyl ether is 40% to 90% by weight of the epoxy resin component.

<23> The adhesive composition according to <21>, wherein the bisphenol A diglycidyl ether is 55% to 75% by weight of the epoxy resin component.
<24> The adhesive composition according to <21>, wherein the bisphenol A diglycidyl ether is 64% by weight of the epoxy resin component.
<25> The adhesive composition according to any of <1> to <20>, wherein the amine formulation is 10% to 60% by weight of the curing agent component.
<26> The adhesive composition according to any of <1> to <20>, wherein the amine formulation is 25% to 45% by weight of the curing agent component.
<27> The adhesive composition according to any of <1> to <20>, wherein the amine formulation is 36% by weight of the curing agent component.
<28> The adhesive composition according to any of <1> to <20>, wherein the ratio by weight of the epoxy resin component to the curing agent component is from 100/65 to 100/85.
<29> The adhesive composition according to any of <1> to <20>, wherein the ratio by weight of the epoxy resin component to the curing agent component is from 100/70 to 100/80.
<30> The adhesive composition according to any of <1> to <20>, wherein the ratio by weight of the epoxy resin component to the curing agent component is 100/76.
<31> The adhesive composition according to any of <1> to <20>, wherein the curing agent component further comprises at least one selected from the group of talc, fumed silica, aluminum, and amine-terminated butadiene-acrylonitrile copolymers.
<32> The adhesive composition according to any of <1> to <20>, wherein the epoxy component further comprises at least one selected from the group of talc and fumed silica.
<33> A wind turbine blade, comprising a first portion adhered to a second portion by an adhesive composition disposed between the first portion and the second portion, wherein the adhesive composition comprises the reaction product of an epoxy resin component comprising at least one epoxy resin, and a curing agent component, wherein the curing agent component comprises a first amine component, the first amine component consisting of N-(3-aminopropyl)cyclohexylamine.
<34> The wind turbine blade according to <33>, wherein the wind turbine blade further comprises a blade length, wherein the blade length is greater than 30 meters.
<35> The wind turbine blade according to <33>, wherein the wind turbine blade further comprises a blade length, wherein the blade length is greater than 50 meters.
<36> A method for forming a wind turbine blade, comprising (a) mixing an epoxy resin component comprising at least one epoxy resin with a curing agent component comprising an amine formulation wherein the amine formulation comprises a first amine component consisting of N-(3-aminopropyl)cyclohexylamine to form an adhesive composition; (b) applying the adhesive composition to a first portion of a wind turbine blade; (c) after step (b), coupling the first portion of the wind turbine blade to a second portion of the wind turbine blade by contacting the second portion to the adhesive composition applied to the first portion of the wind turbine blade; and (d) pressing the first portion and the second portion of the wind turbine blade together for a sufficient period of time to allow the adhesive composition to cure.
<37> The method for forming a wind turbine blade according to <36>, wherein step (b) further comprises applying the adhesive composition to a second portion of the wind turbine blade.
<38> The method for forming a wind turbine blade according to <36>, wherein after step (c), heating the first portion and the second portion of the wind turbine blade to aid in the curing process.

EXAMPLES

FIG. 2 shows a number of curing agent formulations, coded UMX-126B to H, that were developed using APCHA. The formulations were mixed with DGEBA epoxy resin and tested for gel time, time to 10 Pa.s, time to gel point and differential scanning calorimetry. These formulations, coded UMX-126B to H, showed good performance in comparison to a wind blade adhesive curing agent reference formulation (UMX-126A).

While the principles of the invention have been described above in connection with preferred embodiments, it is to be clearly understood that this description is made only by way of example and not as a limitation of the scope of the invention.

The invention claimed is:
1. An adhesive composition comprising the reaction product of:
an epoxy resin component comprising at least one epoxy resin; and
a curing agent component comprising an amine formulation, wherein the amine formulation comprises a first amine component consisting of N-(3-aminopropyl)cyclohexylamine, and a second amine component consisting of at least one selected from the group of polyamides, cycloaliphatic amines, polyether diamines, and ether diamines, wherein the first amine component is 5% to 50% by weight of the amine formulation, and wherein the amine formulation is 10% to 60% by weight of the curing agent component.
2. The adhesive composition of claim 1, wherein the amine formulation comprises at least one polyamide, wherein the at least one polyamide is 10% to 60% by weight of the amine formulation.
3. The adhesive composition of claim 1, wherein the amine formulation comprises at least one cycloaliphatic amine, wherein the at least one cycloaliphatic amine is 10% to 40% by weight of the amine formulation.
4. The adhesive composition of claim 1, wherein the amine formulation comprises at least one polyether diamine, wherein the at least one polyether diamine is 10% to 50% by weight of the amine formulation.
5. The adhesive composition of claim 1, wherein the amine formulation comprises at least one ether diamine, wherein the at least one ether diamine is up to 30% by weight of the amine formulation.
6. The adhesive composition of claim 1, wherein the first amine component is 10% by weight of the amine formulation.
7. The adhesive composition of claim 6, wherein the amine formulation comprises at least one polyamide, wherein the at least one polyamide is 40% by weight of the amine formulation.
8. The adhesive composition of claim 7, wherein the amine formulation further comprises at least one cycloaliphatic amine, wherein the at least one cycloaliphatic amine is 15% by weight of the amine formulation.

9. The adhesive composition of claim 8, wherein the amine formulation further comprises at least one polyether diamine, wherein the at least one polyether diamine is 20% by weight of the amine formulation.

10. The adhesive composition of claim 9, wherein the amine formulation further comprises at least one ether diamine, wherein the at least one ether diamine is 15% by weight of the amine formulation.

11. The adhesive composition of claim 1, wherein the at least one epoxy resin comprises bisphenol A diglycidyl ether.

12. The adhesive composition of claim 11, wherein the bisphenol A diglycidyl ether is 40% to 90% by weight of the epoxy resin component.

13. The adhesive composition of claim 1, wherein the ratio by weight of the epoxy resin component to the curing agent component is from 100/65 to 100/85.

14. The adhesive composition of claim 1, wherein the curing agent component further comprises at least one selected from the group of talc, fumed silica, aluminum, and amine-terminated butadiene-acrylonitrile copolymers.

15. A wind turbine blade, comprising:
   a first portion adhered to a second portion by an adhesive composition disposed between the first portion and the second portion,
   wherein the adhesive composition comprises the reaction product of an epoxy resin component comprising at least one epoxy resin, and a curing agent component, wherein the curing agent component comprises a first amine component, the first amine component consisting of N-(3-aminopropyl)cyclohexylamine, and
   wherein the wind turbine blade further comprises a blade length, wherein the blade length is greater than 30 meters.

16. A method for forming a wind turbine blade, comprising:
   (a) mixing an epoxy resin component comprising at least one epoxy resin with a curing agent component comprising an amine formulation wherein the amine formulation comprises a first amine component consisting of N-(3-aminopropyl)cyclohexylamine to form an adhesive composition;
   (b) applying the adhesive composition to a first portion of a wind turbine blade and a second portion of the wind turbine blade;
   (c) after step (b), coupling the first portion of the wind turbine blade to a second portion of the wind turbine blade by contacting the second portion to the adhesive composition applied to the first portion of the wind turbine blade;
   (d) pressing the first portion and the second portion of the wind turbine blade together for a sufficient period of time to allow the adhesive composition to cure.

17. The method of claim 16, further comprising, after step (c), heating the first portion and the second portion of the wind turbine blade to aid in the curing process.

* * * * *